US012729149B2

(12) United States Patent
Kim et al.

(10) Patent No.: US 12,729,149 B2
(45) **Date of Patent: *Sep. 8, 2026**

(54) ANTIMICROBIAL GLASS COMPOSITION, METHOD FOR PREPARING ANTIMICROBIAL GLASS POWDER THEREOF, AND HOUSEHOLD ELECTRICAL APPLIANCE COMPRISING SAME

(71) Applicant: LG ELECTRONICS INC., Seoul (KR)

(72) Inventors: Daesung Kim, Seoul (KR); Young Seok Kim, Seoul (KR); Namjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 293 days.

This patent is subject to a terminal disclaimer.

(21) Appl. No.: 18/571,327

(22) PCT Filed: Jun. 15, 2022

(86) PCT No.: PCT/KR2022/008492

§ 371 (c)(1),
(2) Date: May 15, 2024

(87) PCT Pub. No.: WO2022/265402

PCT Pub. Date: Dec. 22, 2022

(65) Prior Publication Data

US 2025/0282670 A1 Sep. 11, 2025

(30) Foreign Application Priority Data

Jun. 16, 2021 (KR) ........................ 10-2021-0078075

(51) Int. Cl.
*C03C 3/066* (2006.01)
*A01N 59/16* (2006.01)
(Continued)

(52) U.S. Cl.
CPC .............. *C03C 3/066* (2013.01); *A01N 59/16* (2013.01); *A01P 1/00* (2021.08); *C03C 4/00* (2013.01);
(Continued)

(58) Field of Classification Search
CPC ................................................. C93C 3/00–42
See application file for complete search history.

(56) References Cited

U.S. PATENT DOCUMENTS 6,475,631 B1 * 11/2002 Yamamoto ................ C03C 3/17 424/688
2008/0044488 A1 * 2/2008 Zimmer .................. A61P 31/00 501/59
2022/0272981 A1 9/2022 Kim et al.

FOREIGN PATENT DOCUMENTS

CN 102421718 A * 4/2012 ............. C03C 10/00
JP 2000-203876 7/2000
(Continued)

OTHER PUBLICATIONS

Machine translation CN102421718A (Year: 2025).*
International Search Report dated Sep. 23, 2022 issued in Application No. PCT/KR2022/008492.

*Primary Examiner* — Alexandre F Ferre
(74) *Attorney, Agent, or Firm* — KED & Associates, LLP

(57) ABSTRACT

Disclosed are an antimicrobial glass composition, a method for preparing antimicrobial glass powder thereof, and a household electrical appliance comprising same, the antimicrobial glass composition securing antimicrobial activity and water resistance at the same time by controlling Zn and Sn ions, which are eluted to implement antimicrobial functions, to achieve network formation by using the content ratio of a modifying oxide and a network-forming oxide. As a result, since the antimicrobial glass composition, the method for preparing antimicrobial glass powder thereof,
(Continued)

and the household electrical appliance comprising same, according to the present invention, use an antimicrobial agent having non-elusion properties, this exhibits a remarkable effect in preventing contamination with bacterial, mold, or the like when used as a coating agent in a component group that is in contact with drinking water.

20 Claims, 1 Drawing Sheet

(51) Int. Cl.

| | |
|---|---|
| ***A01P 1/00*** | (2006.01) |
| ***C03C 4/00*** | (2006.01) |
| ***C03C 8/08*** | (2006.01) |
| ***C03C 12/00*** | (2006.01) |
| ***C08K 3/40*** | (2006.01) |

(52) U.S. Cl.

CPC ................ *C03C 8/08* (2013.01); *C03C 12/00* (2013.01); *C08K 3/40* (2013.01); *C03C 2205/00* (2013.01)

(56) References Cited

FOREIGN PATENT DOCUMENTS

| | | |
|---|---|---|
| JP | 2011-225397 | 11/2011 |
| JP | 2014-005194 | 1/2014 |
| KR | 10-2005-0022510 | 3/2005 |
| KR | 10-2021-0007296 | 1/2021 |
| KR | 10-2021-0026838 | 3/2021 |
| KR | 10-2021-0063092 | 6/2021 |

* cited by examiner

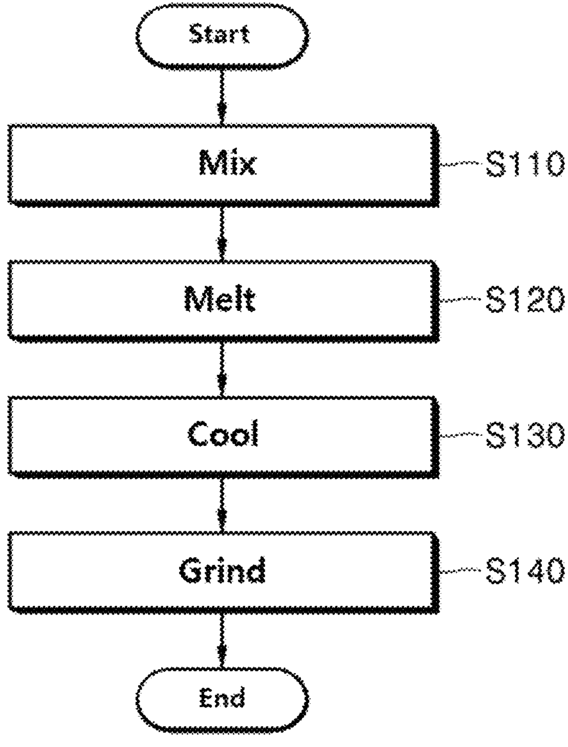
Start
Mix
S110
Melt
S120
Cool
S130
Grind
S140
End

ANTIMICROBIAL GLASS COMPOSITION, METHOD FOR PREPARING ANTIMICROBIAL GLASS POWDER THEREOF, AND HOUSEHOLD ELECTRICAL APPLIANCE COMPRISING SAME

CROSS-REFERENCE TO RELATED PATENT APPLICATIONS

This application is a U.S. National Stage Application under 35 U.S.C. § 371 of PCT Application No. PCT/KR2022/008492, filed Jun. 15, 2022, which claims priority to Korean Patent Application No. 10-2021-0078075, filed Jun. 16, 2021, whose entire disclosures are hereby incorporated by reference.

TECHNICAL FIELD

The present disclosure relates to an antimicrobial glass composition, a method for preparing antimicrobial glass powder thereof, and a household electrical appliance comprising the same.

BACKGROUND ART

Microorganisms such as germs, viruses and bacteria are found in a water purifier, a refrigerator, an oven, a washing machine and the like that are used in our daily lives. If such microorganisms invade the human body, they can infect the human body and become a serious threat to human health. Under the circumstances, there is a growing demand for an antimicrobial glass composition capable of controlling the spread of microorganisms, which is applied to a home appliance such as a water purifier, a refrigerator, an oven, a washing machine and the like.

Among parts of a home appliance, for which a plastic injection mold is used, parts exposed to moisture are readily affected by germs and fungi, causing deterioration in the exterior of the home appliance and degradation in the environment where the home appliance is used.

A variety of germs inhabits a home appliance, and a major strain may vary depending on each part. However, ordinarily, *Pseudomonas aeruginosa* is highly likely to inhabit parts exposed to moisture.

In this context, an antimicrobial agent needs to ensure antimicrobial performance against such a strain. Additionally, the antimicrobial agent needs to be made of a material that is less harmful to the human body and the environment and is durable against high temperature.

Antimicrobial agents may be broadly divided into inorganic ones and organic ones. In the case of an organic antimicrobial agent, a material providing antimicrobial performance is eluted toward a surface by water to show antimicrobial activity against germs, ensuring excellent antimicrobial performance, but when applied to a washing machine, its durability may deteriorate. Additionally, in recent years, the organic antimicrobial agent causes a problem since the eluted material is harmful to the human body and the environment. Further, since the organic antimicrobial agent has a low degradation temperature, the organic antimicrobial agent is likely to be degraded at a time of injection processing.

In the case of an inorganic antimicrobial agent, the inorganic antimicrobial agent has an elution property less than that of an organic antimicrobial agent, and ensures high-temperature durability but causes wettability on the interface with a plastic injection mold, and since Ag is mostly used as an antimicrobial material for the inorganic antimicrobial agent, due to a high price of the antimicrobial material, the inorganic antimicrobial agent is applied limitedly.

Existing non-elutable antimicrobial glass does not mean that the entire glass is non-elutable, and a water-insoluble glass matrix and an ion eluted for antimicrobial properties or glass comprised of a crystalline component are referred to as being non-elutable.

As a result, to show antimicrobial activity, an ion showing antimicrobial performance or a crystal phase need to be eluted. However, the antimicrobial performance of existing elutable antimicrobial glass may not last for a long time, and the antimicrobial performance may not be applied to parts contacting drinking water due to its reliability.

PRIOR ART DOCUMENT (Patent Document 1) KR Patent Publication No. 10-2005-0022510 (published on Mar. 8, 2005)

DESCRIPTION OF THE INVENTION

Technical Problems

The objective of the present disclosure is to provide an antimicrobial glass composition, a method for preparing antimicrobial glass powder thereof, and a household electrical appliance comprising the same that manifests antimicrobial activity lasting permanently, despite no reaction of glass with water even in the water, unlike in an existing elution mechanism.

The objective of the present disclosure is to provide an antimicrobial glass composition, a method for preparing antimicrobial glass powder thereof, and a household electrical appliance comprising the same in which each component of the glass composition and a composition ratio of each component are strictly controlled, and Zn and Sn ions as a component showing antimicrobial performance participate in a network-forming structure, to form a strong glass structure that is not eluted in water, and charge on the surface of glass is controlled such that a glass component is not eluted in water and exhibits antimicrobial properties.

The objective of the present disclosure is to provide an antimicrobial glass composition, a method for preparing antimicrobial glass powder thereof, and a household electrical appliance comprising the same in which each component of the glass composition and a composition ratio of each component are strictly controlled, and the glass composition exhibits non-elution properties, and when used as a coating agent for a group of parts contacting drinking water, produces an excellent effect in preventing contamination caused by germs, fungi and the like.

Aspects according to the present disclosure are not limited to the above ones, and other aspects and advantages that are not mentioned above can be clearly understood from the following description and can be more clearly understood from the embodiments set forth herein. Additionally, understandably, the aspects and advantages in the present disclosure are embodied via means and combinations thereof that are described in the appended claims.

Technical Solutions

An antimicrobial glass composition, a method for preparing antimicrobial glass powder thereof, and a household electrical appliance comprising the same, according to the present disclosure, in which Zn and Sn ions eluted to implement an antimicrobial function are controlled to achieve network formation by using the content ratio of a modifying oxide and a network-forming oxide, ensure water resistance as well as antimicrobial activity.

An antimicrobial glass composition, a method for preparing antimicrobial glass powder thereof, and a household electrical appliance comprising the same, according to the present disclosure, in which a metal ion in glass allows charge, i.e., a zeta potential, on the surface of the glass to have a positive charge, to create a charge atmosphere where germs ordinarily having a negative charge is attracted and not grown, kill germs.

As a result, the antimicrobial glass composition according to the present disclosure is an antimicrobial agent showing non-elution properties, and when used as a coating agent for a group of parts contacting drinking water, produces an excellent effect in preventing contamination caused by germs, fungi and the like.

To this end, the antimicrobial glass composition according to the present disclosure comprises 15-40 wt % of $SiO_2$, 4-20 wt % of one or more sorts of $B_2O_3$ and $P_2O_5$, 8-20 wt % of one or more sorts of $Na_2O$ and $K_2O$, 3-15 wt % of one or more sorts of CaO, MgO and $WO_3$, and 34-60 wt % of one or more sorts of ZnO and SnO.

Additionally, the antimicrobial glass composition according to the present disclosure may further comprise 0.1 wt % or less of one or more sorts of $Ag_2O$, $Ag_3PO_4$ and $AgNO_3$.

Advantageous Effects

According to the present disclosure, an antimicrobial glass composition, a method for preparing antimicrobial glass powder thereof, and a household electrical appliance comprising the same in which each component of the glass composition and a composition ratio of each component are strictly controlled, and Zn and Sn ions as a component showing antimicrobial performance participate in a network-forming structure, to form a strong glass structure that is not eluted in water, and charge on the surface of glass is controlled such that the glass is not eluted in water and exhibits antimicrobial properties.

According to the present disclosure, the antimicrobial glass composition is a water-insoluble antimicrobial agent comprised of a multi-purpose antimicrobial component, and when used as an additive of a coating material for a glass shelf and a plastic injection-molded product, is usable permanently.

According to the present disclosure, the antimicrobial glass composition is an antimicrobial agent showing non-elution properties, and when used as a coating agent for a group of parts contacting drinking water, produces an excellent effect in preventing contamination caused by germs, fungi and the like.

Specific effects are described along with the above-described effects in the section of detailed description.

BRIEF DESCRIPTION OF THE DRAWINGS

FIG. 1 is a processing flow chart of a method for preparing antimicrobial glass powder of an embodiment.

DETAILED DESCRIPTION OF EXEMPLARY EMBODIMENTS

The above-described aspects, features and advantages are specifically described hereafter with reference to the accompanying drawings such that one having ordinary skill in the art to which the present disclosure pertains can embody the technical idea of the disclosure easily. In the disclosure, detailed description of known technologies in relation to the disclosure is omitted if it is deemed to make the gist of the disclosure unnecessarily vague. Hereafter, preferred embodiments according to the disclosure are specifically described with reference to the accompanying drawings. In the drawings, identical reference numerals can denote identical or similar components.

In the disclosure, the singular forms "a", "an" and "the" are intended to include the plural forms as well, unless explicitly indicated otherwise. In the disclosure, the terms "comprise" or "include" and the like, set forth herein, are not interpreted as necessarily including all the stated components or steps but can be interpreted as excluding some of the stated components or steps or can be interpreted as including additional components or steps.

Hereinafter, an antimicrobial glass composition, a method for preparing antimicrobial glass powder thereof, and a household electrical appliance comprising the same in several embodiments are described.

Antimicrobial Glass Composition

An antimicrobial glass composition of an embodiment manifests antimicrobial activity that lasts permanently despite no reaction of glass with water even in the water, unlike in an existing elution mechanism.

To this end, the antimicrobial glass composition of an embodiment forms a strong glass structure that is not eluted in water, by controlling each component and a composition ratio thereof and allowing Zn and Sn ions as a component showing antimicrobial performance to participate in a network-forming structure, and exhibits antimicrobial properties by controlling charge on the surface of glass without elution in water, to take advantage of the fact that an intermediate oxide serves as a modifying oxide or a network-forming oxide, at a time of formation of the glass.

As described above, the antimicrobial glass composition of an embodiment, in which Zn and Sn ions eluted to implement an antimicrobial function are controlled to achieve network formation by using the content ratio of a modifying oxide and a network-forming oxide, ensures antimicrobial activity and water resistance at the same time.

According to the present disclosure, in a mechanism for exhibiting antimicrobial activity, a metal ion in glass allows charge, i.e., a zeta potential, on the surface of the glass to have a positive charge, and a charge atmosphere where germs ordinarily having a negative charge is attracted and not grown is created, to kill germs.

Factors for preparing an antimicrobial glass composition having excellent durability can be broadly divided into two.

The first factor is a glass matrix that forms a glass structure and determines chemical durability. The glass matrix plays a role similar to that of an existing carrier of an inorganic antimicrobial agent (scattering a material exhibiting antimicrobial properties on surface).

The existing carrier is formed in such a way that an antimicrobial component is carried on the surface of an inorganic antimicrobial agent, but according to the present disclosure, a metal material exhibiting antimicrobial properties exists in a glass matrix, in the form of an ion. To manufacture a glass matrix having excellent durability, the content ratio of a glass former such as $SiO_2$ and $B_2O_3$, and a combination ratio between alkaline components (mixed alkali effect in glass: the mechanical properties and the like of glass may change non-linearly depending on the ratio of an alkaline component) are very important factors.

The second factor is the effect of a metal component included in glass. That is, a metal component may be a main factor for showing antimicrobial performance, and each component may have a different antimicrobial property. Additionally, durability may vary depending on an ionic bond state and a covalent bond state, because of an interaction of the metal component with a component in a glass matrix. Thus, importantly, a composition ratio of antimicrobial glass needs to be optimized.

To this end, the antimicrobial glass composition of an embodiment comprises 15-40 wt % of $SiO_2$, 4-20 wt % of one or more sorts of $B_2O_3$ and $P_2O_5$, 8-20 wt % of one or more sorts of $Na_2O$ and $K_2O$, 3-15 wt % of one or more sorts of CaO, MgO and $WO_3$, and 34-60 wt % of one or more sorts of ZnO and SnO.

Additionally, the antimicrobial glass composition of an embodiment may further comprise 0.1 wt % or less of one or more sorts of $Ag_2O$, $Ag_3PO_4$ and $AgNO_3$.

The antimicrobial glass composition of an embodiment in the present disclosure may be a water-insoluble antimicrobial agent comprised of a multi-purpose antimicrobial component, and when used as an additive to a coating agent for a glass shelf and to a plastic injection-molded product, may be used permanently.

Further, the antimicrobial glass composition of an embodiment in the present disclosure is an antimicrobial agent exhibiting non-elution properties, and when used as a coating agent for a group of parts contacting drinking water, has an excellent effect in preventing the contamination of germs, fungi and the like.

Hereinafter, the role and content of each component of the antimicrobial glass composition of an embodiment in the present disclosure are specifically described.

As a network-forming oxide, $SiO_2$, $B_2O_3$ and $P_2O_5$ are essential components that form a skeleton structure of glass, and enable vitrification based on a covalent bond.

A glass former enabling vitrification, $SiO_2$ is an essential component and plays a role of a skeleton in a structural aspect of glass. In the case where $SiO_2$ is included in a proper amount or greater, viscosity increases at a time of melting of glass, causing a decrease in workability and a yield rate during a cooling process. Additionally, $SiO_2$ does not act as a direct component that exhibits antimicrobial activity and forms less OH— groups on the surface of glass than $P_2O_5$ as a representative network-forming oxide, such that the surface of glass is positively charged because of metal ions in the glass.

Accordingly, $SiO_2$ is preferably added at a content ratio of 15-40 wt % with respect to the entire weight of the antimicrobial glass composition in the present disclosure. In the case where less than 15 wt % of $SiO_2$ is added, opalescence may occur, or a heterogenization phenomenon where transparent glass is mixed may occur due to an escape of a vitrification area, since the glass-forming oxide is not enough. In the case where greater than 40 wt % of $SiO_2$ is added, it is difficult that a surface charge of glass is controlled to a positive value, causing deterioration in antimicrobial activity.

As representative network-forming oxides, $B_2O_3$ and $P_2O_5$ are essential components enabling sufficient vitrification, together with $SiO_2$. $B_2O_3$ and $P_2O_5$ have a low melting point and are used to decrease a eutectic point of a molten material. Additionally, $B_2O_3$ and $P_2O_5$ increase the solubility of a rigid component ($Al_2O_3$, CuO and the like) at a time of melting for vitrification, to enable homogeneous glass. However, in the case where a predetermined amount or greater of $B_2O_3$ and $P_2O_5$ is added, a coupling structure of glass deteriorates, and water resistance and the like deteriorates.

Accordingly, $B_2O_3$ and $P_2O_5$ are used slightly to decrease a melting point, preferably, such that water-insoluble antimicrobial glass may be embodied.

To this end, one or more sorts of $B_2O_3$ and $P_2O_5$ are preferably added at a content ratio of 4-20 wt % with respect to the entire weight of the antimicrobial glass composition in the present disclosure. In the case where less than 4 wt % of one or more sorts of $B_2O_3$ and $P_2O_5$ are added, flux is not enough, and the glass escape from a vitrification area, causing a non-melting phenomenon. In the case where greater than 20 wt % of one or more sorts of $B_2O_3$ and $P_2O_5$ is added, a structural problem of B and P in a network-formed structured may cause deterioration in water resistance due to properties intrinsic to the components.

According to the present disclosure, $SiO_2$ is added with content greater than content of $B_2O_3$, preferably. In the case where the amount of $SiO_2$ added is greater than the amount of $B_2O_3$ added, water resistance may be readily ensured.

An alkali oxide such as $Na_2O$ and $K_2O$ serves as a network modifier that is non-crosslinked in a glass composition. The components may not be vitrified solely, but in the case where the alkali oxide such as $Na_2O$ and $K_2O$ is mixed with the network-forming agent such as $SiO_2$ and $B_2O_3$ and the like at a predetermined ratio, the alkali oxide such as $Na_2O$ and $K_2O$ may be vitrified. In the case where only one of the components is added to a glass composition, the durability of glass may deteriorate in an area where vitrification is possible. However, in the case where two or more components are included in a glass composition, the durability of the glass may improve depending on ratios of the components. This is referred to as a mixed alkali effect.

Thus, the alkali oxide such as $Na_2O$ and $K_2O$ improve antimicrobial activity by its properties of occupying a modifying oxide site in glass first. Further, the alkali oxide such as $Na_2O$ and $K_2O$ helps ZnO and SnO as an intermediate oxide to contribute network formation and based on improvement in the durability of the intermediate oxide, contributes to manifestation of antimicrobial activity resulting from water-insoluble properties and surface charges.

Preferably, one or more sorts of $Na_2O$ and $K_2O$ are added at a content ratio of 8-20 wt % with respect to the entire weight of the antimicrobial glass composition in the present disclosure. In the case where less than 8 wt % of one or more sorts of $Na_2O$ and $K_2O$ is added, the glass may escape from a vitrification area, and a non-molten material may be formed, since a flux is not enough. In the case where greater than 20 wt % of one or more sorts of $Na_2O$ and $K_2O$ is added, alkali ions are easily substituted with $H_3O^+$ ions of water, and elution escalates, based on a basic theory of elution of glass, causing deterioration in water resistance.

Herein, 3-8 wt % of $Na_2O$ is added, and 3-12 wt % of $K_2O$ is added, more preferably.

Basically, an alkaline earth oxide such as CaO, MgO and $WO_3$ serves as a modifying oxide that is non-crosslinked in glass. The alkaline earth oxide may not be solely vitrified, but in the case where the alkaline earth oxide is mixed with a network-forming agent such as $SiO_2$ and $B_2O_3$ and the like at a predetermined ratio, the alkaline earth oxide may be vitrified.

The alkaline earth oxide such as CaO, MgO and $WO_3$ has a +2 charge unlike an alkali oxide, and since the +2 charge needs to be substituted with 2 ions of a water molecule, the alkaline earth oxide hardly exchanges ions and is used as a factor for improving durability. Accordingly, the alkaline earth oxide such as CaO, MgO and $WO_3$, and the alkali oxide ensuring high durability among modifying oxides and indirectly contributing to manifestation of water insolubility and antimicrobial properties by occupying a modifying oxide site serve the same purpose.

Preferably, one or more sorts of CaO, MgO and $WO_3$ are added at a content ratio of 3-15 wt % with respect to the entire weight of the antimicrobial glass composition in the present disclosure. In the case where less than 3 wt % of one or more sorts of CaO, MgO and $WO_3$ is added, one or more sorts of CaO, MgO and $WO_3$ may not strengthen a structure in a modifying oxide site and may not prevent the elution of an alkali, causing deterioration in water resistance. In the case where greater than 15 wt % of one or more sorts of CaO, MgO and $WO_3$ is added, an alkaline earth oxide melting as a material melting at high temperature may not sufficiently melt and may escape from a vitrification area, causing formation of a non-molten material.

ZnO and SnO are components that are substituted with a portion of a network-forming oxide and covalently coupled to the network-forming oxide, and serve as a modifying oxide as well as a network-forming oxide. Additionally, ZnO and SnO significantly contribute to production of an antimicrobial effect.

As an intermediate oxide, ZnO and SnO need to have a small automic radius to participate in a networking-forming structure in glass and to have high electronegativity such that a difference between the ZnO and SnO and oxygen is small. Since the intermediate oxide has a greater automic radius and less electronegativity than Si, P and B as an ordinary network-forming oxide, the intermediate oxide is a component that may hardly ensure glass formation solely, but in the situation where a network-forming oxide exists, is substituted with the network-forming oxide and serves as the network-forming oxide. ZnO and SnO serve as a modifying oxide only in the case where a predetermined content or less of ZnO and SnO is added, but form a covalent bond and ensure rapid improvement in durability in the case where a predetermined content or greater of ZnO and SnO is added. Herein, the predetermined content is determined based on the content of a network-forming oxide and a modifying oxide.

Preferably, one or more sorts of ZnO and SnO are added at a content ratio of 34-60 wt % with respect to the entire weight of the antimicrobial glass composition in the present disclosure. In the case where less than 34 wt % of one or more sorts of ZnO and SnO is added, an absolute amount of a material embodying antimicrobial performance is not enough, making it difficult to show sufficient antimicrobial activity. In the case where greater than 60 wt % of one or more sorts of ZnO and SnO is added, one or more sorts of ZnO and SnO may not homogeneously exist in an ionic state, in glass, may be partially crystallized and may escape from a vitrification area, causing opalescence and a heterogenization phenomenon where transparent glass is mixed.

Further, to ensure case of glass formation of the composition, the components $SiO_2$, $B_2O_3$ and $P_2O_5$ may be added in the composition, with entire content greater than entire content of $Na_2O$, $K_2O$, CaO, MgO and $WO_3$.

$Ag_2O$, $Ag_3PO_4$ and $AgNO_3$ are components that exist in an ionic state, in glass, and are effective in the manifestation of antimicrobial activity. Additionally, $Ag_2O$, $Ag_3PO_4$ and $AgNO_3$ decrease a melting point. However, in the case where greater than 0.1 wt % of one or more sorts of $Ag_2O$, $Ag_3PO_4$ and $AgNO_3$ is added, vitrification may become unstable due to the precipitation of silver metal. To prevent this from happening, one or more sorts of $Ag_2O$, $Ag_3PO_4$ and $AgNO_3$ added is preferably limited to 0.1 wt % or less with respect to the entire weight of the antimicrobial glass composition in the present disclosure.

Method for Preparing Antimicrobial Glass Powder

Hereinafter, the method for preparing antimicrobial glass powder of an embodiment is described with reference to the accompanying drawing.

FIG. 1 is a processing flow chart of a method for preparing antimicrobial glass powder of an embodiment.

As illustrated in FIG. 1, the method for preparing antimicrobial glass powder in the embodiment comprises a mixing step (S110), a melting step (S120), a cooling step (S130) and a grinding step (S140), as illustrated in FIG. 1.

Mixing

In the mixing step (S110), 15-40 wt % of $SiO_2$, 4-20 wt % of one or more sorts of $B_2O_3$ and $P_2O_5$, 8-20 wt % of one or more sorts of $Na_2O$ and $K_2O$, 3-15 wt % of one or more sorts of CaO, MgO and $WO_3$, and 34-60 wt % of one or more sorts of ZnO and SnO are mixed and stirred to form an antimicrobial glass composition.

Herein, $SiO_2$ is added with content greater than content of $B_2O_3$, preferably.

Additionally, 3-8 wt % of $Na_2O$ is added, and 3-12 wt % of $K_2O$ is added.

Further, the antimicrobial glass composition may further comprise wt % or less of one or more sorts of $Ag_2O$, $Ag_3PO_4$ and $AgNO_3$.

Melting

In the melting step (S120), the antimicrobial glass composition is melted.

In this step, the melting step is performed at 1,100-1,400° C. for 1-60 minutes, preferably. In the case where a melting temperature is less than 1,100° C., or melting time is less than 1 minute, the antimicrobial glass composition may not be melted completely, causing immiscibility of a glass-molten material. In the case where a melting temperature is greater than 1,400° C., or melting time is greater than 60 minutes, excessive energy and time are required, causing failure in ensuring economic efficiency.

Cooling

In the cooling step (S130), the antimicrobial glass composition molten is cooled up to room temperature.

In this step, the cooling step is performed based on cooling in furnace, preferably. In the case where air cooling or water cooling is applied in the cooling step, the internal stress of antimicrobial glass may develop seriously, and in some cases, there may be a crack. Thus, cooling in furnace is preferable in the cooling step.

Grinding

In the grinding step (S140), the antimicrobial glass cooled is ground. At this time, in the grinding step, any one of a ball mill, a jet mill and a planetary mill that are widely known may be applied.

In the grinding step, the antimicrobial glass is ground finely, to prepare antimicrobial glass powder. Preferably, the antimicrobial glass powder may have an average diameter of 30 μm or less, and more preferably, have a range of average diameters of 5-15 μm.

A household electrical appliance of an embodiment comprises a rein material, and a plastic injection mold where the antimicrobial glass powder prepared in the above-described method is added to the resin material. In the present disclosure, the household electrical appliance may comprise a water purifier, a washing machine, a standing air conditioner, a systematic air conditioner, a refrigerator and the like, but not be limited.

Herein, the plastic injection mold comprises 95.0-99.0 wt % of the resin material and 1.0-5.0 wt % of the antimicrobial glass powder.

In the case where less than 1.0 wt % of the antimicrobial glass powder is added with respect to the entire weight of the plastic injection mold, antimicrobial activity against *Pseudomonas aeruginosa* is not sufficient. In the case where greater than 5.0 wt % of the antimicrobial glass powder is added with respect to the entire weight of the plastic injection mold, mechanical properties are likely to deteriorate.

The resin material comprises ay least one or more of polypropylene (PP), polycarbonate (PC), ethylene propylene rubber (EPDM), acrylonitrile-buradiene-styrene (ABS) and high impact polystyrene (HIPS).

At this time, the antimicrobial glass powder comprises 15-40 wt % of $SiO_2$, 4-20 wt % of one or more sorts of $B_2O_3$ and $P_2O_5$, 8-20 wt % of one or more sorts of $Na_2O$ and $K_2O$, 3-15 wt % of one or more sorts of CaO, MgO and $WO_3$, and 34-60 wt % of one or more sorts of ZnO and SnO.

Herein, 3-8 wt % of $Na_2O$ is added, and 3-12 wt % of $K_2O$ is added.

Additionally, the plastic injection mold may further comprise a functional additive in addition to the antimicrobial glass powder. The functional additive may comprise one or more sorts selected from an oxidation prevention agent, a foaming agent, an impact modifier, a nucleant, a coupling agent and the like.

Accordingly, the antimicrobial glass powder is applied to the surfaces of parts of the household electrical appliance in the embodiments, which are vulnerable to the breeding of germs and often contact moisture, such that the household electrical appliance shows antimicrobial activity of preventing the habitation and growth of a variety of microorganisms.

Embodiments

Hereinafter, the configuration and operation of the subject matter of the present disclosure are described specifically with reference to the preferred embodiment of the present disclosure, but provided as a preferred example, and are not to be interpreted as limiting the subject matter of the present disclosure in any aspect.

Details that are not described herein may be sufficiently inferred by one skilled in the art, and accordingly, the details are not described.

1. Preparing Antimicrobial Glass Powder Sample

Table 1 shows the composition and composition ratio of an antimicrobial glass composition in embodiments and comparative examples.

Antimicrobial glass compositions having composition in the embodiments and comparative examples were respectively melted at 1,200° C. in an electric furnace, and then cooled on a stainless steel plate, in the form of glass bulk, based on air cooling. Then obtained glass was ground with a dry ball mill, and then passed through a 400 mesh sieve to prepare an antimicrobial glass powder sample.

Herein, $Na_2CO_3$, $K_{2C}O_3$ and $CaCO_3$ were respectively used as a raw material for the components $Na_2O$, $K_2O$ and CaO, and the remaining components listed in Tables 1 and 2 were used. Further, vitrification distinguished based on a property of homogeneous glass and occurrence of opalescence and non-molten material.

TABLE 1

| | Embodiment | | | | | Comparative example | | | | |
|---|---|---|---|---|---|---|---|---|---|---|
| Component | 1 | 2 | 3 | 4 | 5 | 1 | 2 | 3 | 4 | 5 |
| $SiO_2$ | 28.4 | 35.1 | 30.1 | 37.2 | 15.2 | 15.2 | 42.4 | 15.1 | 11.1 | 25.1 |
| $P_2O_5$ | 0.4 | — | 2 | 1.2 | 1.3 | 11.7 | 4.8 | 34.8 | 5.4 | 1.1 |
| $B_2O_3$ | 4.7 | 5.8 | 7.3 | 16.3 | 13.7 | 19.3 | 3.8 | 1.2 | 9.9 | 0.7 |
| $Na_2O$ | 7.4 | 5.6 | 4.5 | 3.1 | 4.3 | 15.5 | 11.9 | 0.8 | 3.9 | 7.8 |
| $K_2O$ | 10.7 | 9.6 | 6.5 | 5 | 3.8 | 6.5 | 5.7 | 1.3 | 2.8 | 8.2 |
| $WO_3$ | 3.4 | — | — | 0.7 | 2.4 | 0.7 | 3.7 | 1.5 | 0.9 | 1.7 |
| CaO | 9.6 | 8.8 | 8.5 | 2.1 | 0.7 | — | 8.8 | 1.4 | 2.7 | 21.4 |
| $MnO_2$ | 1.2 | — | — | 0.3 | — | — | 2.4 | 2.7 | 1.1 | — |
| SnO | 1.9 | — | 3 | 0.7 | 2.7 | 0.7 | 1.1 | — | 1.1 | — |
| ZnO | 32.3 | 35.1 | 38.1 | 33.4 | 55.9 | 30.4 | 15.4 | 41.2 | 61.1 | 34 |
| Total | 100 | 100 | 100 | 100 | 100 | 100 | 100 | 100 | 100 | 100 |

(Unit: Wt %)

2. Evaluation of Physical Property of Antimicrobial Glass Powder

Table 2 shows results of evaluation of physical properties of samples in embodiments and comparative examples.

1) Evaluation of Antimicrobial Activity

The antimicrobial activity against four sorts of germs (*Staphylococcus aureus, Escherichia coil, Klebsiella pneumonia* and *Pseudomonas aeruginosa*) was evaluated based on the shaker flask method (ASTM E2149-13a), with respect to the embodiments and comparative examples where vitrification proceeded homogeneously.

2) Evaluation of Chemical Durability

To evaluate durability of the embodiments and comparative examples where vitrification proceeded homogeneously, it was evaluated whether a level of elution of the components listed in Table 5 hereinafter satisfied the WHO guide and the domestic drinking water standard, based on the ASTM C1285-14 (an evaluation method of durability of glass and glass ceramic) test method. Herein, the chemical durability at 50° C., at time 32 was expressed as 0 in the case where an elution amount of each component listed in Table 3 was less than a reference value, and expressed as X in the case where the elution amount of each component listed in Table 3 was the reference value or greater.

TABLE 2

| Category | | Embodiment 1 | Embodiment 2 | Embodiment 3 | Embodiment 4 | Embodiment 5 | Comparative example 1 | Comparative example 2 | Comparative example 3 | Comparative example 4 | Comparative example 5 |
|---|---|---|---|---|---|---|---|---|---|---|---|
| Vitrification (○, X) | | ○ | ○ | ○ | ○ | ○ | ○ | ○ | ○ | X | X |
| Antimicrobial activity | *Staphylococcus aureus* | 99.9% | 99.9% | 99.9% | 99.9% | 99.9% | 97.0% | 47.4% | 96.0% | — | — |
| | *Escherichia coil* | 99.9% | 99.9% | 99.9% | 99.9% | 99.9% | 84.4% | 32.7% | 47.4% | — | — |
| | *Klebsiella pneumoniae* | 99.9% | 99.9% | 99.9% | 99.9% | 99.9% | 98.4% | 82.4% | 99.0% | — | — |
| | *Pseudomonas aeruginosa* | 99.9% | 99.9% | 99.9% | 99.9% | 99.9% | 74.0% | 53.4% | 64.1% | — | — |
| Evaluation of chemical durability | | ○ | ○ | ○ | ○ | ○ | X | ○ | X | — | — |

TABLE 3

| Elution amount (ppm) | B | Zn | Mn |
|---|---|---|---|
| WHO guide | 2.4 | — | — |
| Domestic drinking water | 1.0 | 3 | 0.05 |

As illustrated in Table 1, the samples prepared in embodiments 1 to 5 showed 99% or greater of antimicrobial activity against all the four sorts of germs.

However, in the comparative examples, homogeneous vitrification was not ensured except form comparative examples 1 to 3.

Additionally, the samples prepared in comparative examples 1 to 3 did not show excellent antimicrobial activity against all the four sorts of germs.

Further, as a result of evaluation of durability, in the case where the samples prepared in embodiments 1 to 5 were used, the elution of B, Zn and Mn did not occur, exhibiting excellent chemical durability.

However, in the sample prepared in comparative example 2, elusion did not occur, but in the samples prepared in comparative examples 1 and 3, elution occurred causing deterioration in chemical durability.

3. Preparing Injection-Molded Product

As shown in the table hereinafter, 2 wt % of each of the prepared antimicrobial glass powder and 98 wt % of polypropylene (PP) resin were mixed and injection-molded with an injection molding device to manufacture each injection-molded product of 200 mm (width), 100 mm (length) and 3 mm (thickness). To see an antimicrobial degree of each injection-molded product, an antimicrobial activity level was measured against *Staphylococcus aureus* and *Escherichia coli*, based on the ASTM E2149-13a shaker flask method. Further, antimicrobial activity against *Klebsiella pneumoniae* and *Pseudomonas aeruginosa* was further evaluated.

TABLE 4

| Antimicrobial activity (JIS Z 2801, film attachment method) | Embodiment 1 | Embodiment 2 | Comparative example 1 | Comparative example 2 |
|---|---|---|---|---|
| *Staphylococcus aureus* | 99.99% | 99.99% | 74.1% | 51.4% |
| *Escherichia coil* | 99.99% | 99.99% | 57.6% | 45.7% |
| *Klebsiella pneumoniae* | 99.99% | 99.99% | 69.2% | 79.4% |
| *Pseudomonas aeruginosa* | 99.9% | 99.9% | 59.1% | 61.4% |

As shown in Table 4, the antimicrobial activity levels of all the injection-molded products manufactured in the embodiments were measured at 2.0 or greater, ensuing 99% or greater of antimicrobial activity.

However, the antimicrobial activity levels of the injection-molded products manufactured in the comparative examples were measured at less than 2.0, ensuring 80% or less of antimicrobial activity.

As shown in the results of the experiments, the injection-molded products manufactured in the embodiments exhibit more excellent antimicrobial activity than the injection-molded products manufactured in the comparative examples.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, the effects and predictable effects based on the configurations in the disclosure are to be included within the range of the disclosure though not explicitly described in the description of the embodiment.

DESCRIPTION OF REFERENCE NUMERALS

S110: Mixing step
S120: Melting step
S130: Cooling step
S140: Grinding step

The invention claimed is:

1. An antimicrobial glass composition, comprising:

15-40 wt % of $SiO_2$;

4-20 wt % of at least one selected from a group consisting of $B_2O_3$ and $P_2O_5$;

8-20 wt % of at least one selected from a group consisting of $Na_2O$ and $K_2O$;

3-15 wt % of at least one selected from a group consisting of CaO, MgO, and $WO_3$; and 34-60 wt % of at least one selected from a group consisting of ZnO and SnO, wherein when the antimicrobial glass composition comprises $WO_3$, a content of the $WO_3$ is 3.4 wt % or less.

2. The antimicrobial glass composition of claim 1, wherein the glass composition comprises more by wt % of $SiO_2$ than $B_2O_3$.

3. The antimicrobial glass composition of claim 1, wherein the glass composition comprises 3-8 wt % of $Na_2O$, and the glass composition comprises 3-12 wt % of $K_2O$.

4. The antimicrobial glass composition of claim 1, wherein the glass composition comprises more of $SiO_2$, $B_2O_3$ and $P_2O_5$ than $Na_2O$, $K_2O$, CaO, MgO and $WO_3$.

5. The antimicrobial glass composition of claim 1, wherein the antimicrobial glass composition comprises less than 0.1 wt % of $Ag_2O$, $Ag_3PO_4$ and $AgNO_3$.

6. The antimicrobial glass composition of claim 1, wherein:

the glass composition is melted;

the melted glass composition is cooled; and the cooled glass composition is ground to form antimicrobial glass powder.

7. The antimicrobial glass composition of claim 6, wherein the glass composition comprises more by wt % of $SiO_2$ than $B_2O_3$.

8. The antimicrobial glass composition of claim 6, wherein the glass composition comprises 3-8 wt % of $Na_2O$, and the glass composition comprises 3-12 wt % of $K_2O$.

9. The antimicrobial glass composition of claim 6, wherein the glass composition comprises more of $SiO_2$, $B_2O_3$ and $P_2O_5$ than $Na_2O$, $K_2O$, CaO, MgO and $WO_3$.

10. The antimicrobial glass composition of claim 6, wherein the antimicrobial glass composition comprises less than 0.1 wt % of $Ag_2O$, $Ag_3PO_4$ and $AgNO_3$.

11. The antimicrobial glass composition of claim 6, wherein the glass composition is melted at 1,100-1,400° C. for 1-60 minutes.

12. A household appliance, comprising:

a plastic injection mold in which an antimicrobial glass powder is added to a resin material, wherein the plastic injection mold includes:

95.0-99.0 wt % of the resin material; and 1.0-5.0 wt % of the antimicrobial glass powder, wherein the antimicrobial glass powder is formed from the antimicrobial glass composition of claim 1.

13. The household appliance of claim 12, wherein the resin material comprises at least one of polypropylene (PP), polycarbonate (PC), ethylene propylene rubber (EPDM), acrylonitrile-buradiene-styrene (ABS) or high impact polystyrene (HIPS).

14. The household appliance of claim 12, wherein the antimicrobial glass composition comprises 3-8 wt % of $Na_2O$, and the antimicrobial glass composition comprises 3-12 wt % of $K_2O$.

15. The household appliance of claim 12, wherein the glass composition comprises more $SiO_2$, $B_2O_3$ and $P_2O_5$ than $Na_2O$, $K_2O$, CaO, MgO and $WO_3$.

16. The antimicrobial glass composition of claim 1, wherein the antimicrobial glass composition is provided on a surface of a home appliance.

17. The antimicrobial glass composition of claim 6, wherein the antimicrobial glass powder is passed through a 400 mesh sieve.

18. The antimicrobial glass composition of claim 6, wherein the antimicrobial glass powder has an average diameter of 30 μm or less.

19. The antimicrobial glass composition of claim 6, wherein the antimicrobial glass powder has an average diameter of 15 μm to 25 μm.

20. The antimicrobial glass composition of claim 1, wherein the antimicrobial glass composition is to form an antimicrobial glass powder.

* * * * *